(12) United States Patent
Ha et al.

(10) Patent No.: US 10,794,373 B2
(45) Date of Patent: Oct. 6, 2020

(54) LINEAR COMPRESSOR

(71) Applicant: LG ELECTRONICS INC., Seoul (KR)

(72) Inventors: Seongho Ha, Seoul (KR); Jaeyoun Lim, Seoul (KR); Jungwan Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 227 days.

(21) Appl. No.: 15/837,095

(22) Filed: Dec. 11, 2017

(65) Prior Publication Data
US 2018/0372080 A1 Dec. 27, 2018

(30) Foreign Application Priority Data

Jun. 27, 2017 (KR) .......................... 10-2017-0081051

(51) Int. Cl.
*F04B 35/04* (2006.01)
*H02K 33/02* (2006.01)
(Continued)

(52) U.S. Cl.
CPC .......... *F04B 35/045* (2013.01); *F04B 39/121* (2013.01); *H02K 33/02* (2013.01); *F04B 39/0005* (2013.01)

(58) Field of Classification Search
CPC ...... F04B 35/04; F04B 35/045; F04B 39/121; F04B 2203/04; F04B 39/00;
(Continued)

(56) References Cited

U.S. PATENT DOCUMENTS

| 4,179,630 A * | 12/1979 | Stuber | F04B 35/045 |
| | | | 310/15 |
| 2003/0175135 A1* | 9/2003 | Heo | F04B 35/045 |
| | | | 417/363 |

(Continued)

FOREIGN PATENT DOCUMENTS

| CN | 101971468 | 2/2011 |
| CN | 105317660 | 2/2016 |

(Continued)

OTHER PUBLICATIONS

Chinese Office Action (with English translation) dated May 23, 2019 issued in CN Application No. 201710743788.9.
European Search Report dated Jun. 4, 2018.

*Primary Examiner* — Alexander B Comley
(74) *Attorney, Agent, or Firm* — KED & Associates LLP

(57) ABSTRACT

A linear compressor is provided that may include a shell having a cylindrical shape, a frame fixed inside the shell, a cylinder inserted to pass through the frame, a piston provided in the cylinder, a motor that linearly reciprocates the piston, and a stator cover coupled to the motor. The stator cover may include a cover body and a reinforcement sleeve bent from an outer edge of the cover body, the reinforcement sleeve having a plurality of protrusions that protrudes in a radial direction from the reinforcement sleeve. A portion of the shell corresponding to a position of each of the plurality of protrusions includes a bulge that protrudes in the radial direction of the shell.

11 Claims, 8 Drawing Sheets

(51) Int. Cl.
   *F04B 39/12* (2006.01)
   *F04B 39/00* (2006.01)
(58) Field of Classification Search
   CPC .............. F04B 39/12–122; F04B 39/127;
                    F04B 39/14; F04B 53/146; F04B
                    53/16–162; F04B 53/22; F04B 9/06;
                    F04B 17/04; F04B 17/046; H02K
                    33/02–06
   USPC .......................................... 417/417
   See application file for complete search history.

(56) References Cited

U.S. PATENT DOCUMENTS

| | | |
|---|---|---|
| 2012/0045351 A1 | 2/2012 | Stolpe et al. |
| 2013/0129540 A1 | 5/2013 | Song et al. |
| 2015/0093269 A1 | 4/2015 | Iwano et al. |
| 2015/0184651 A1* | 7/2015 | Ki .................... F04B 17/03 417/349 |
| 2016/0017872 A1* | 1/2016 | Kim .................. F04B 35/045 417/415 |

FOREIGN PATENT DOCUMENTS

| | | |
|---|---|---|
| EP | 2977611 | 3/2018 |
| KR | 10-2010-0112475 | 10/2010 |
| KR | 10-2016-0010985 | 1/2016 |

* cited by examiner

LINEAR COMPRESSOR

CROSS-REFERENCE TO RELATED APPLICATION(S)

The present application claims the benefits of priority to Korean Patent Application No. 10-2017-0081051 filed in Korea on Jun. 27, 2017, which is herein incorporated by reference in its entirety.

BACKGROUND

1. Field

A linear compressor is disclosed herein.

2. Background

In general, compressors are machines that receive power from a power generation device, such as an electric motor or a turbine, to compress air, a refrigerant, or various working gases, thereby increasing a pressure thereof. Compressors are being widely used in home appliances or industrial fields.

Compressors may be largely classified into three different types. The first type is a reciprocating compressor, in which a compression space, into and/from which a working gas, such as a refrigerant, is suctioned and discharged, is defined between a piston and a cylinder to allow the piston to linearly reciprocate within the cylinder, thereby compressing the refrigerant. The second type is a rotary compressor, in which a compression space, into and/from which a working gas, such as a refrigerant, is suctioned or discharged, is defined between a roller that eccentrically rotates and a cylinder to allow the roller to eccentrically rotate along an inner wall of the cylinder, thereby compressing the refrigerant. The third type is a scroll compressor, in which a compression space into and/from which a working gas, such as a refrigerant, is suctioned or discharged, is defined between an orbiting scroll and a fixed scroll to compress the refrigerant while the orbiting scroll rotates along the fixed scroll.

A linear compressor is being widely developed which has a simple structure and which is directly connected to a drive motor, in which a piston linearly reciprocates, to improve compression efficiency without mechanical losses due to motion conversion. In general, the linear compressor suctions and compresses a refrigerant within a sealed shell while the piston linearly reciprocates within the cylinder by a linear motor and then discharges the compressed refrigerant.

The linear motor includes a permanent magnet provided between an inner stator and an outer stator. The permanent magnet is driven to linearly reciprocate by electromagnetic force between the permanent magnet and the inner (or outer) stator.

As the permanent magnet is connected to the piston, the refrigerant is suctioned and compressed while the piston linearly reciprocates within the cylinder and then the compressed refrigerant is discharged.

A linear compressor and a stator structure of a motor mounted on the linear compressor are disclosed in related art Korean Patent Publication No. 2016-0010985, which is hereby incorporated by reference. Recently, to improve efficiency of compressors, the compressor is being designed to increase a size of the motor while maintaining a diameter of the shell of the compressor.

A method for increasing a number of turns of a coil constituting the stator has been proposed as a method for increasing the size of the motor. In this case, as the number of turns of the coil increases, the stator increases in outer diameter. Thus, to prevent a position of a screw used to fix a cover of the stator to a frame of the compressor from interfering with the coil, a position of a screw hole defined in the stator cover must be away from a center of the stator cover in a radial direction.

Also, the stator cover must increase in outer diameter. Thus, when the stator cover increases in outer diameter, a distance between the stator cover and an inner circumferential surface of the shell decreases. As a result, a possibility of vibration generated when the motor collides with the shell while the compressor operates increases.

BRIEF DESCRIPTION OF THE DRAWINGS

Embodiments will be described in detail with reference to the following drawings in which like reference numerals refer to like elements, and wherein.

DETAILED DESCRIPTION

Figure 1:
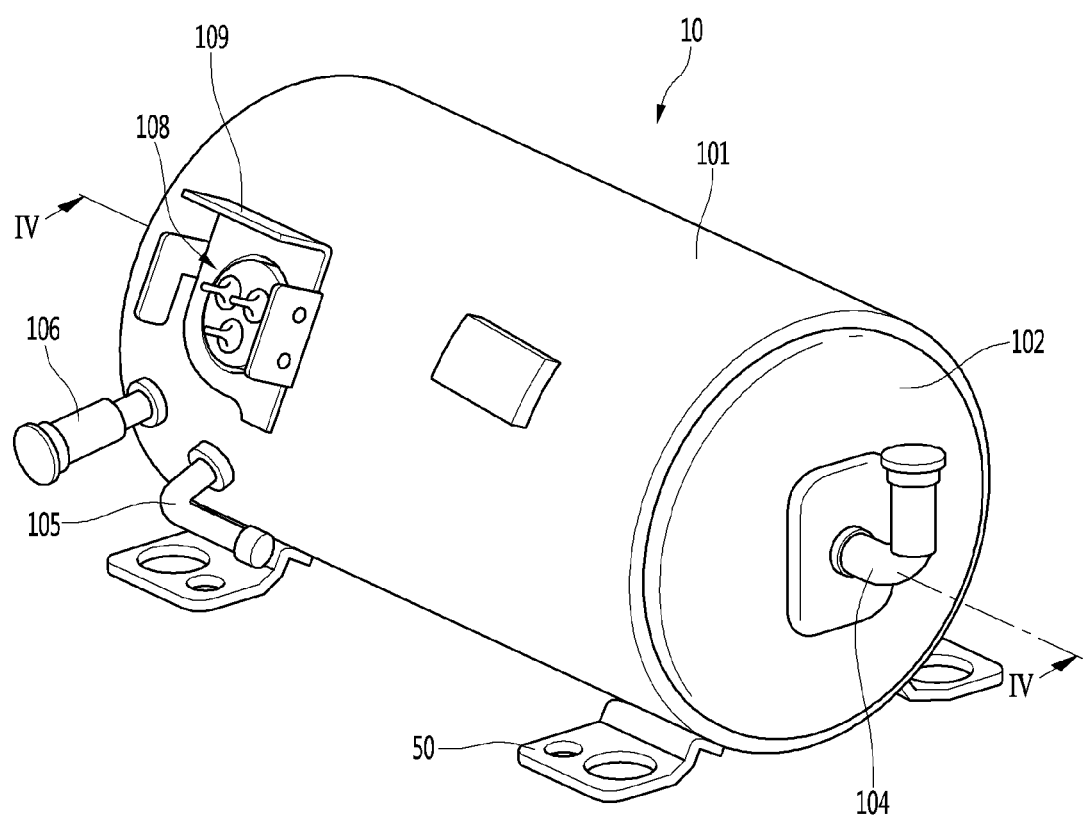
FIG. 1 is a perspective view illustrating an outer appearance of a linear compressor according to an embodiment.

Hereinafter, a linear compressor to which a coupling structure of a cylinder and a frame is applied according to an embodiment will be described with reference to the accompanying drawings. FIG. 1 is a perspective view illustrating an outer appearance of a linear compressor according to an embodiment, and FIG. 2 is an exploded perspective view illustrating a shell and a shell cover of the linear compressor according to an embodiment.

Figure 2:
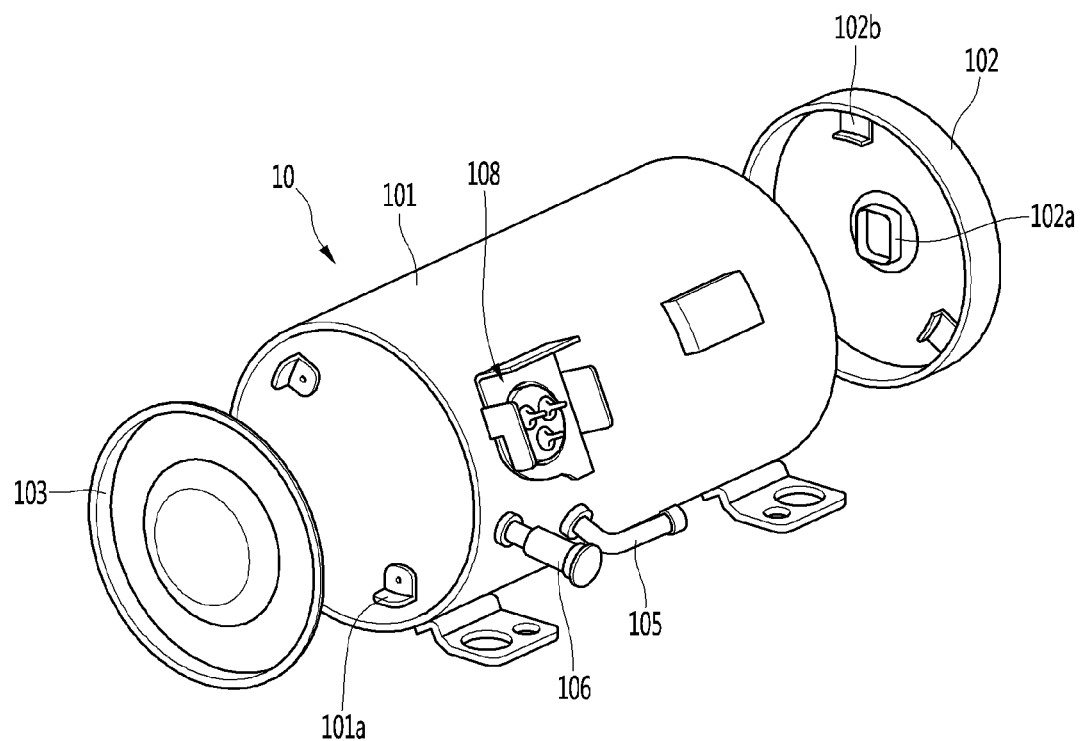
FIG. 2 is an exploded perspective view illustrating a shell and a shell cover of the linear compressor according to an embodiment.

Referring to FIGS. 1 and 2, a linear compressor 10 according to an embodiment may include a shell 101 and a shell cover coupled to the shell 101. The shell cover may include a first shell cover 102 and a second shell cover 103. Each of the shell covers 102 and 103 may be understood as one component of the shell 101.

A leg 50 may be coupled to a lower portion of the shell 101. The leg 50 may be coupled to a base of a product in which the linear compressor 10 is installed. For example, the product may include a refrigerator, and the base may include a machine room base of the refrigerator. For another example, the product may include an outdoor unit of an air conditioner, and the base may include a base of the outdoor unit.

The shell 101 may have a horizontal cylindrical shape. Thus, when the linear compressor 10 is installed on the machine room base of the refrigerator, the machine room may be reduced in height. The shell 101 may have a cylindrical shape; however, embodiments are not limited thereto.

A terminal block 108 may be installed on an outer surface of the shell 101. The terminal block 108 may be a connection part that transmits external power to a motor assembly (see reference numeral 140 of FIG. 3) of the linear compressor 10. A bracket 109 may be installed outside the terminal block 108. The bracket 109 may protect the terminal block 108 against an external impact.

Both ends of the shell 101 may be open. The first and second shell covers 102 and 103 may be coupled to both the ends, that is, a first end and a second end of the shell 101, respectively. An inner space of the shell 101 may be sealed by the shell covers 102 and 103.

In FIG. 1, the first shell cover 102 may be provided at a first portion or end (right in the drawings) of the linear compressor 10, and the second shell cover 103 may be provided at a second portion or end (left in the drawings) of the linear compressor 10. That is, the first and second shell covers 102 and 103 may face each other. The linear compressor 10 may further include a plurality of pipes 104, 105, and 106 provided in the shell 101 or the shell covers 102 and 103 to suction and discharge a refrigerant.

The plurality of pipes 104, 105, and 106 may include a suction pipe 104 through which the refrigerant may be suctioned into the linear compressor 10, a discharge pipe 105 through which the compressed refrigerant may be discharged from the linear compressor 10, and a process pipe through which refrigerant may be supplemented to the linear compressor 10. For example, the suction pipe 104 may be coupled to the first shell cover 102. The refrigerant may be suctioned into the linear compressor 10 through the suction pipe 104 in an axial direction.

The discharge pipe 105 may be coupled to an outer circumferential surface of the shell 101. The refrigerant suctioned through the suction pipe 104 may flow in the axial direction and then be compressed. Also, the compressed refrigerant may be discharged through the discharge pipe 105. The discharge pipe 105 may be arranged at a position which is adjacent to the second shell cover 103 rather than the first shell cover 102.

The process pipe 106 may be coupled to an outer circumferential surface of the shell 101. A user may inject refrigerant into the linear compressor 10 through the process pipe 106. The process pipe 106 may be coupled to the shell 101 at a height different from a height of the discharge pipe 105 to avoid interference with the discharge pipe 105. The height may be a distance from the leg 50 in a vertical direction (or a radial direction). As the discharge pipe 105 and the process pipe 106 are coupled to the outer circumferential surface of the shell 101 at heights different from each other, work convenience may be improved.

A cover support part or bracket 102a may be provided on an inner surface of the first shell cover 102. A second support device (or second support) 185, which will be described hereinafter, may be coupled to the cover support part 102a. The cover support part 102a and the second support device 185 may support a main body of the linear compressor 10. The main body of the compressor may represent a component set provided in the shell 101. For example, the main body may include a drive part or drive that reciprocates forward and backward and a support part or support that supports the drive part.

Figure 3:
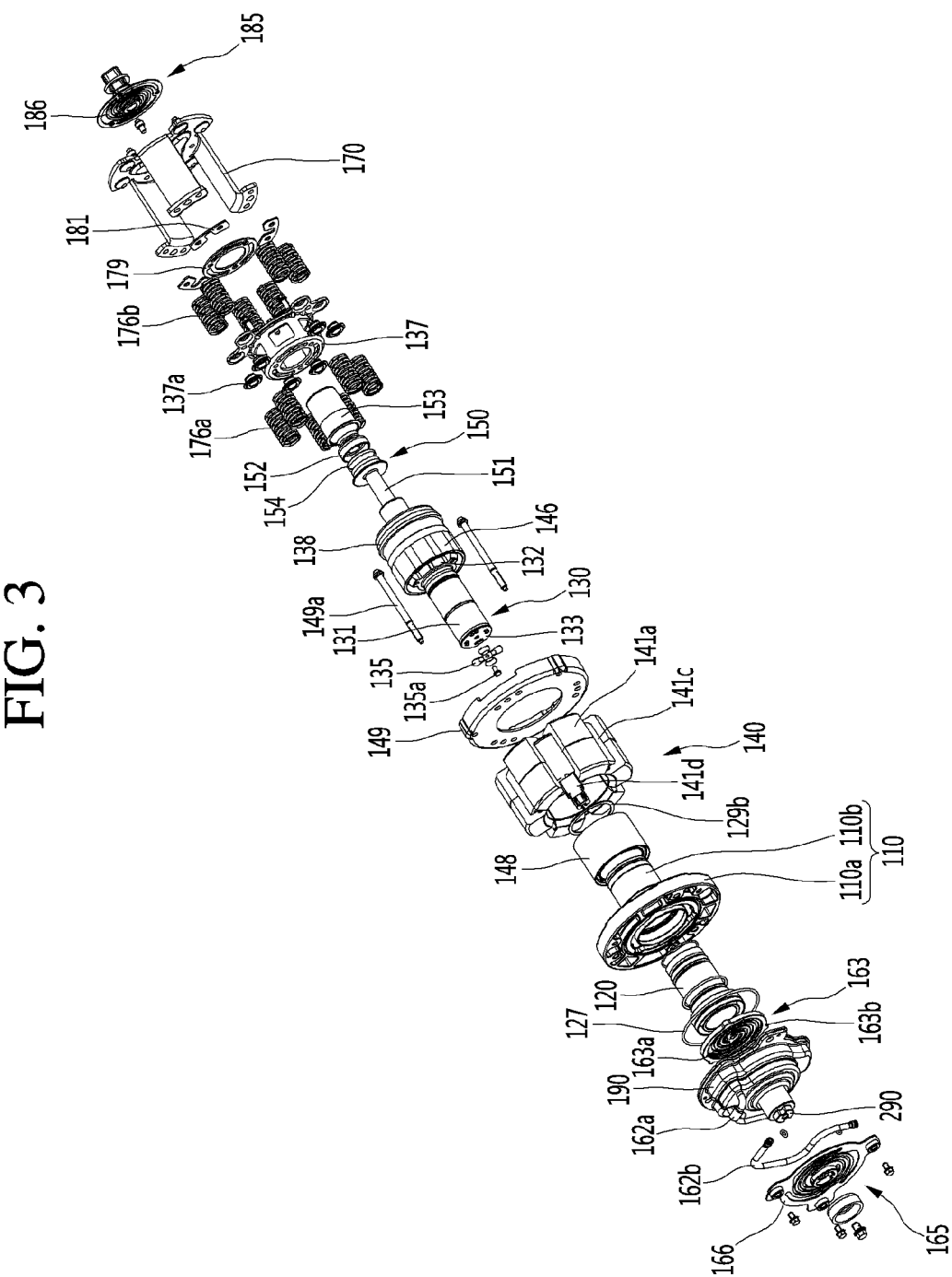
FIG. 3 is an exploded perspective view illustrating a main body of the linear compressor according to an embodiment.
Figure 4:
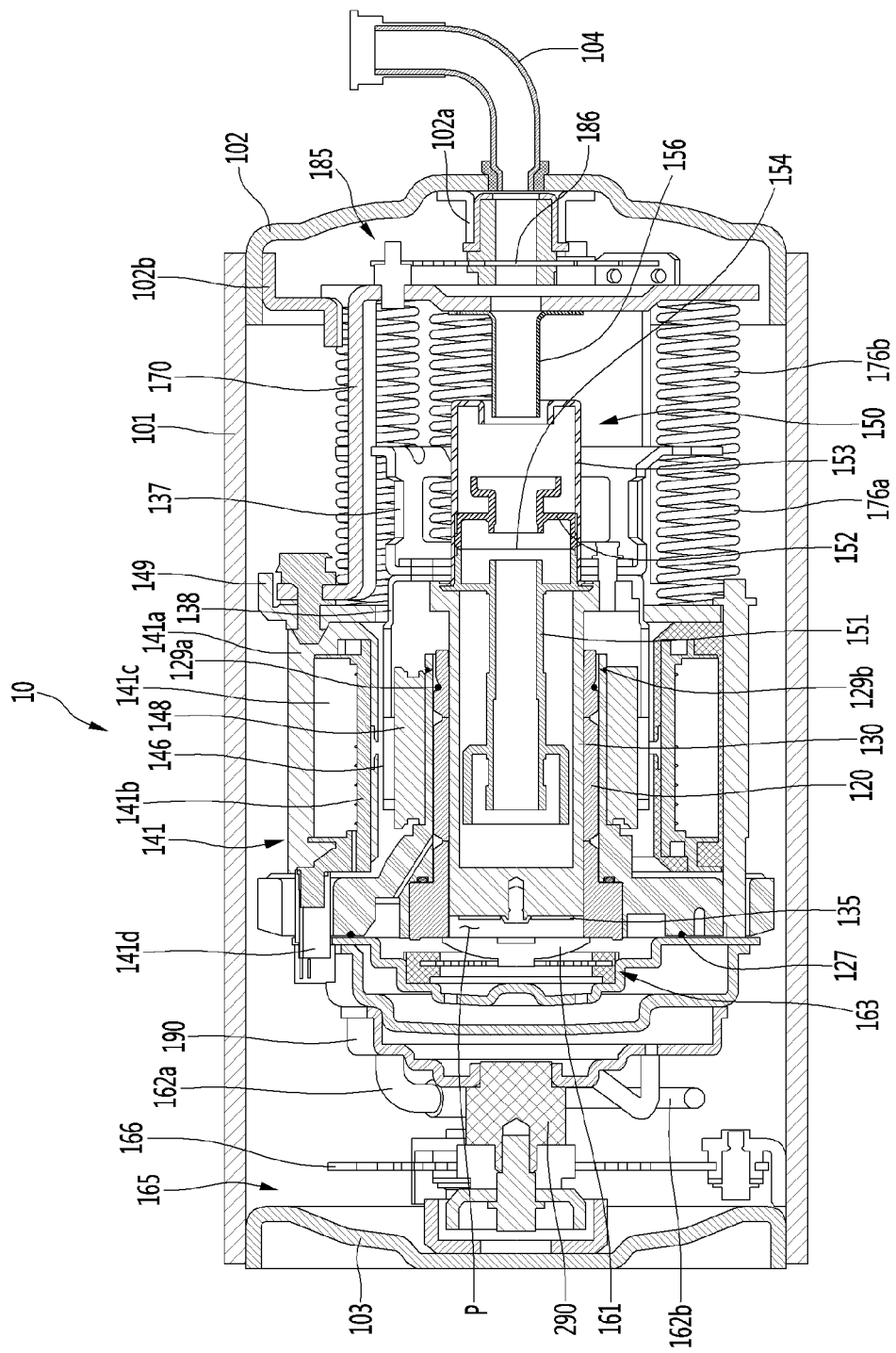
FIG. 4 is a longitudinal cross-sectional view of the linear compressor, taken along line IV-IV of FIG. 1, according to an embodiment.

As illustrated in FIGS. 3 and 4, the drive part may include components such as a piston 130, a magnet frame 138, a permanent magnet 146, a support 137, and a suction muffler 150. Also, the support part may include components such as resonant springs 176a and 176b, a rear cover 170, a stator cover 149, a first support device (or first support)165, and the second support device 185.

A stopper 102b may be provided on the inner surface of the first shell cover 102. The stopper 102b may be a component that prevents the main body of the compressor, particularly, the motor assembly 140, from colliding with the shell 101 and thus bearing damaged due to vibration or impact occurring during transportation of the linear compressor 10.

The stopper 102b may be adjacent to the rear cover 170, which will be described hereinafter. Thus, when the linear compressor 10 is shaken, the rear cover 170 may contact the stopper 102b to prevent the impact from being transmitted to the motor assembly 140.

A spring coupling part or coupler 101a may be provided on an inner surface of the shell 101. For example, the spring coupling part 101a may be provided at a position which is adjacent to the second shell cover 103. The spring coupling part 101a may be coupled to a first support spring 166 of the first support device 165, which will be described hereinafter. As the spring coupling part 101a and the second support device 600 are coupled to each other, the main body of the compressor may be stably supported inside the shell 101 without colliding with the shell 101.

FIG. 3 is an exploded perspective view illustrating the main body of the linear compressor according to an embodiment, and FIG. 4 is a longitudinal cross-sectional view of the linear compressor, taken along line IV-IV of FIG. 1, according to an embodiment. Referring to FIGS. 3 and 4, the main body of the liner compressor 10, which is provided in the shell 101, according to an embodiment may include a frame 110, cylinder 120 inserted into a center of the frame 110, a piston 130 linearly reciprocating within the cylinder 120, and motor assembly 140 that applies drive force to the piston 130. The motor assembly 140 may be a linear motor that allows the piston 130 to linearly reciprocate in the axial direction of the shell 101.

The linear compressor 10 may include suction muffler 150. The suction muffler 150 may be coupled to the piston 130 and configured to reduce noise generated from the refrigerant suctioned through the suction pipe 104. Also, the refrigerant suctioned through the suction pipe 104 may flow into the piston 130 via the suction muffler 150. For example, while the refrigerant passes through the suction muffler 150, a flow noise of the refrigerant may be reduced.

The suction muffler 150 may include a plurality of mufflers. The plurality of mufflers may include a first muffler 151, a second muffler 152, and a third muffler 153, which may be coupled to each other.

The first muffler 151 may be located within the piston 130, and the second muffler 152 may be coupled to a rear end of the first muffler 151. Also, the third muffler 153 may accommodate the second muffler 152 therein and may have a front end coupled to the rear end of the first muffler 151. In view of a flow direction of the refrigerant, the refrigerant suctioned through the suction pipe 104 may successively pass through the third muffler 153, the second muffler 152, and the first muffler 151. In this process, the flow noise of the refrigerant may be reduced.

A muffler filter 154 may be installed in the suction muffler 150. The muffler filter 154 may be provided at an interface at which the first muffler 151 and the second muffler 152 are coupled to each other. For example, the muffler filter 154 may have a circular shape, and an edge of the muffler filter 154 may be arranged and supported between coupling surfaces of the first and second mufflers 151 and 152.

The term "axial direction" may refer to a direction which is the same as a direction in which the piston 130 reciprocates, that is, an extension direction of a longitudinal central axis of the cylindrical shell 101. Also, in the "axial direction", a direction which is directed from the suction pipe 104 toward a compression space P, that is, a direction in which the refrigerant flows, may be defined as a "frontward direction", and a direction opposite to the frontward direction may be defined as a "rearward direction". When the piston 130 moves forward, the compression space P may be compressed. On the other hand, the term "radial direction" may be defined as a radial direction of the shell 101, that is, a direction perpendicular to the direction in which the piston 130 reciprocates.

The piston 130 may include a piston body 131 having an approximately cylindrical shape and a piston flange part (or piston flange) 132 extending from a rear end of the piston body 131 in the radial direction. The piston body 131 may reciprocate within the cylinder 120, and the piston flange part 132 may reciprocate outside the cylinder 120. The piston body 131 may accommodate at least a portion of the first muffler 151.

The cylinder 120 may include the compression space P in which the refrigerant may be compressed by the piston 130. Also, a plurality of suction holes 133 may be defined at positions spaced a predetermined distance from a center of a front surface of the piston body 131 in the radial direction.

The plurality of suction holes 133 may be spaced apart from each other along a circumferential direction of the piston 130, and the refrigerant may be introduced into the compression space P through the plurality of suction holes 133. The plurality of suction holes 133 may be spaced a predetermined distance from each other in a circumferential direction of the front surface of the piston 130, and a plurality of groups of the suction holes 133 may be provided.

A suction valve 135 that selectively opens the suction hole 133 may be provided at a front side of each of the suction holes 133. The suction valve 135 may be fixed to the front surface of the piston body 131 through a coupling member (or fastener) 135a, such as a screw or a bolt.

A discharge cover 190 defining a discharge space for the refrigerant discharged from the compression space P and a discharge valve assembly coupled to the discharge cover 190 to discharge the refrigerant compressed in the compression space P to the discharge space may be provided at a front side of the compression space P. The discharge cover 190 may be provided such that a plurality of covers are laminated.

The discharge valve assembly may include a discharge valve 161 and a spring assembly 163 that provides elastic force in a direction in which the discharge valve 161 is attached to a front end of the cylinder 120. When a pressure within the compression space P is above a discharge pressure, the discharge valve 161 may be separated from the front surface of the cylinder 120 to discharge the compressed refrigerant to the discharge space defined by the discharge cover 190. Also, when the pressure within the compression space P is above the discharge pressure, the spring assembly 163 may be contracted to allow the discharge valve 161 to be spaced apart from the front end of the cylinder 120.

The spring assembly 163 may include a valve spring 163a and a spring support part (or spring support) 163b that supports the valve spring 163a to the discharge cover 190.

For example, the valve spring 163a may include a plate spring. The discharge valve 161 may be coupled to the valve spring 163a, and a rear portion or a rear surface of the discharge valve 161 may be attached and supported on the front surface (or the front end) of the cylinder 120.

When the discharge valve 161 is supported on the front surface of the cylinder 120, the compression space P may be maintained in a sealed state. When the discharge valve 161 is spaced apart from the front surface of the cylinder 120, the compression space P may be opened to allow the refrigerant in the compression space P to be discharged.

The compression space P may be a space defined between the suction valve 135 and the discharge valve 161. Also, the suction valve 135 may be arranged at one side of the compression space P, that is, a first side, and the discharge valve 161 may be arranged at the other side of the compression space P, that is, an opposite or second side of the compression P.

While the piston 130 linearly reciprocates within the cylinder 120, when the pressure within the compression space P is less than a suction pressure of the refrigerant, the suction valve 135 may be opened to allow the refrigerant to be introduced into the compression space P. On the other hand, when the pressure within the compression space P is above the suction pressure, the suction valve 135 may be closed, and thus, the piston 130 may move forward to compress the refrigerant within the compression space P.

When the pressure within the compression space P is greater than a pressure (discharge pressure) of the first discharge space, the valve spring 163a may be deformed forward to allow the discharge valve 161 to be spaced apart from the cylinder 120. The refrigerant within the compression space P may be discharged into the discharge space through a gap between the discharge valve 161 and the cylinder 120. When the discharge of the refrigerant is completed, the valve spring 163a may provide a restoring force to the discharge valve 161 so that the discharge valve 161 may again contact the front end of the cylinder 120.

The linear compressor 10 may further include a cover pipe 162a. The cover pipe 162a may be coupled to the discharge cover 190 to discharge the refrigerant flowing to the discharge space defined in the discharge cover 190 to the outside.

The linear compressor 10 may further include a loop pipe 162b. The loop pipe 162b may have a first end coupled to a discharge end of the cover pipe 162a and a second end connected to the discharge pipe 105 provided in the shell 101.

The loop pipe 162b may be made of a flexible material and have a length relatively longer than a length of the cover pipe 162a. The loop pipe 162b may extend from the cover pipe 162a along an inner circumferential surface of the shell 101 and be coupled to the discharge pipe 105.

The frame 110 may be a component to fix the cylinder 120. For example, the cylinder 120 may be inserted into a central portion of the frame 110. The discharge cover 190 may be coupled to a front surface of the frame 110 using a coupling member or fastener.

The motor assembly 140 may include an outer stator 141 fixed to the frame 110 to surround the cylinder 120, an inner stator 148 spaced inward from the outer stator 141, and the permanent magnet 146 provided in a space between the outer stator 141 and the inner stator 148. The permanent magnet 146 may linearly reciprocate by mutual electromagnetic force between the outer stator 141 and the inner stator 148. Also, the permanent magnet 146 may be a single magnet having one polarity or a plurality of magnets having three polarities coupled to each other.

The permanent magnet 146 may be provided on the magnet frame 138. The magnet frame 138 may have an approximately cylindrical shape and may be inserted into the space between the outer stator 141 and the inner stator 148.

The magnet frame 138 may be coupled to the piston flange part 132 to extend in the frontward direction (the axial direction). The permanent magnet 146 may be attached to a front end of the magnet frame 138 or an outer circumferential surface of the magnet frame 138. Thus, when the permanent magnet 146 reciprocates in the axial direction, the piston 130 may reciprocate together with the permanent magnet 146 in the axial direction.

The outer stator 141 may include coil winding bodies 141*b*, 141*c*, and 141*d* and a stator core 141*a*. The coil winding bodies 141*b*, 141*c*, and 141*d* may include a bobbin 141*b* and a coil 141*c* wound in a circumferential direction of the bobbin 141*b*. Also, the coil winding bodies 141*b*, 141*c*, and 141*d* may further include a terminal part (or terminal) 141*d* that guides a power line connected to the coil 141*c* so that the power line is led out or exposed to the outside of the outer stator 141.

The stator core 141*a* may include a plurality of core blocks in which a plurality of laminations are laminated in a circumferential direction. The plurality of core blocks may surround at least a portion of the coil winding bodies 141*b* and 141*c*.

Stator cover 149 may be arranged on or at one or a first side of the outer stator 141. That is, the outer stator 141 may have a first side supported by the frame 110 and a second side supported by the stator cover 149.

The linear compressor 10 may further include a cover coupling member (or cover fastener) 149*a* that couples the stator cover 149 to the frame 110. The cover coupling member 149*a* may pass through the stator cover 149 and extend forward to the frame 110 and may be coupled to the frame 110.

The inner stator 148 may be fixed to a circumference of the frame 110. Also, in the inner stator 148, the plurality of laminations may be stacked in the circumferential direction outside the frame 110.

The linear compressor 10 may further include support 137 that supports a rear end of the piston 130. The support 137 may be coupled to a rear portion of the piston 130 and may have a hollow part so that the muffler 150 may pass through an inside of the support 137. The piston flange part 132, the magnet frame 138, and the support 137 may be coupled to each other using a coupling member or fastener to form one body.

A balance weight 179 may be coupled to the support 137. A weight of the balance weight 179 may be determined based on a drive frequency range of the compressor body.

The linear compressor 10 may further include a rear cover 170. The rear cover 170 may be coupled to the stator cover 149 to extend backward and may be supported by the second support device 185.

The rear cover 170 may include three support legs, and the three support legs may be coupled to a rear surface of the stator cover 149. A spacer 181 may be provided between the three support legs and the rear surface of the stator cover 149. A distance from the stator cover 149 to a rear end of the rear cover 170 may be determined by adjusting a thickness of the spacer 181. Also, the rear cover 170 may be spring-supported by the support 137.

The linear compressor 10 may further include an inflow guide part (or inflow guide) 156 coupled to the rear cover 170 to guide an inflow of the refrigerant into the muffler 150. At least a portion of the inflow guide part 156 may be inserted into the suction muffler 150.

The linear compressor 10 may include a plurality of resonant springs 176 which may be adjustable in natural frequency to allow the piston 130 to perform a resonant motion. The plurality of resonant springs may include a plurality of first resonant springs 176*a* supported between the support 137 and the stator cover 149 and a plurality of second resonant springs 176*b* supported between the support 137 and the rear cover 170. Due operation of the plurality of resonant springs, the compressor body may stably reciprocate within the shell 101 of the linear compressor 10 to minimize the generation of vibration or noise due to movement of the compressor body.

The support 137 may include a first spring support part (or first spring support) 137*a* coupled to the first resonant spring 176*a*. The linear compressor 10 may include the frame 110 and a plurality of sealing members or seals to increase a coupling force between peripheral components around the frame 110.

The plurality of sealing members may include a first sealing member (or O-ring) 127 provided at a portion at which the frame 110 and the discharge cover 190 are coupled to each other. The plurality of sealing members may further include a third sealing member (or O-ring) 129*a* provided between the cylinder 120 and the frame 110.

The plurality of sealing members may further include a second sealing member (or O-ring) 129*a* provided at a portion at which the frame 110 and the inner stator 148 are coupled to each other. Each of the first to third sealing members 127, 129*a*, and 129*b* may have a ring shape.

The linear compressor 10 may further include the first support device 165 that supports the front end of the main body of the linear compressor 10. The first support device 165 may be coupled to a support coupling part (or support coupler) 290 of the discharge cover 190. The first support device 165 may be adjacent to the second shell cover 103 to elastically support the main body of the linear compressor 10. The first support device 165 may include a first support spring 166, and the first support spring 166 may be coupled to the spring coupling part 101*a*.

The linear compressor 10 may further include the second support device 185 that supports the rear end of the main body of the linear compressor 10. The second support device 185 may be coupled to the rear cover 170. The second support device 185 may be coupled to the first shell cover 102 to elastically support the main body of the compressor 10. The second support device 185 may include a second support spring 186, and the second support spring 186 may be coupled to the cover support part 102*a*. The frame 110 may include a frame head 110*a* having a disk shape and a frame body 110*b* extending from a center of a rear surface of the frame head 110*a* to accommodate the cylinder 120 therein.

Figure 5:
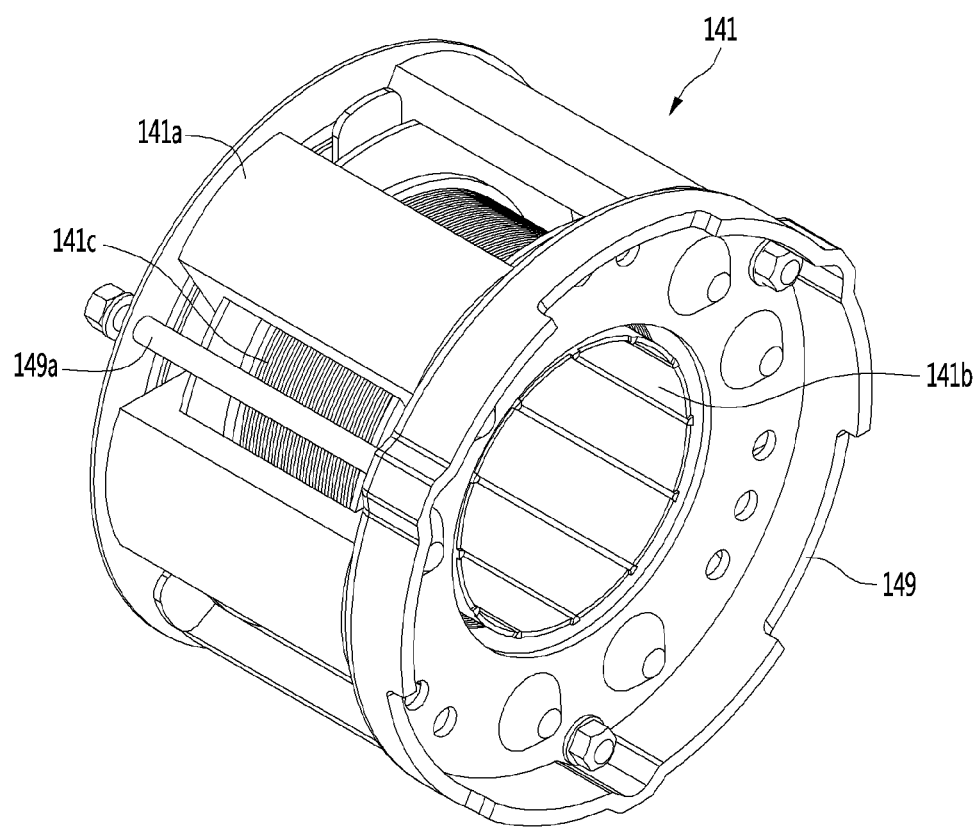
FIG. 5 is a perspective view of an outer stator constituting a motor mounted on the compressor according to an embodiment.
Figure 6:
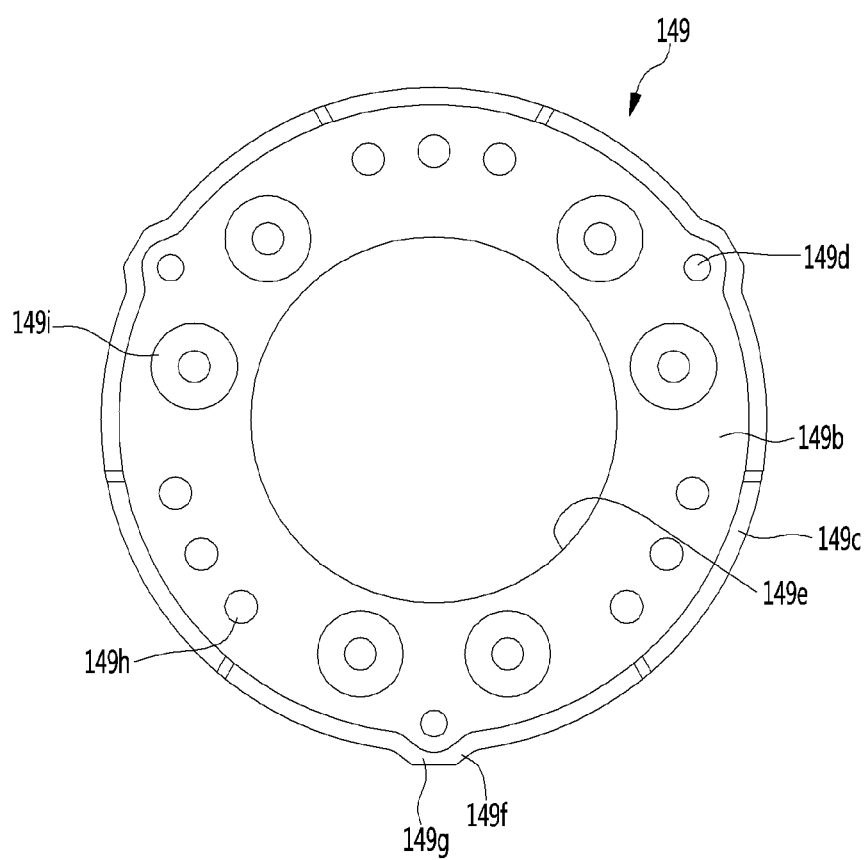
FIG. 6 is a front view of a stator cover constituting the outer stator.

FIG. 5 is a perspective view of the outer stator constituting a motor mounted on the compressor according to an embodiment, and FIG. 6 is a front view of the stator cover constituting the outer stator. Referring to FIGS. 5 and 6, the outer stator 141 according to an embodiment may include the coil winding bodies 141*b* and 141*c* and the stator core 141*a* as described above. The coil winding bodies 141*b* and 141*c* may include a bobbin 141*b* and a coil 141*c* wound in a circumferential direction of the bobbin 141*b*.

The stator core 141*a* may include a plurality of core blocks in which a plurality of laminations are laminated in a circumferential direction. The plurality of core blocks may surround at least a portion of the coil winding bodies 141b and 141c.

The outer stator 141 may include the stator cover 149 coupled to one or a first end of the stator core 141a. The outer stator according to an embodiment may be mounted on the frame 110 by the cover coupling member 149a that passes through the stator cover 149 and is fixed to the frame 110. The stator cover 149 may have a first surface to which the stator core 141a is attached and a second surface to which the rear cover 170 is fixed by the coupling member. Also, the resonant springs 176a may be seated on the second surface of the stator cover 149.

The stator cover 149 may include a cover body 149b having a disk shape in which a through-hole 149e is defined and a reinforcement sleeve 149c bent along an outer edge of the cover body 149b. When the outer stator 141 is mounted on the frame 110, an end of the reinforcement sleeve 149c may be directed to the first shell cover 102.

A plurality of frame coupling holes 149d defined along the outer edge of the cover body 149b. For example, three frame coupling holes 149d may be defined at equal distances along a circumferential direction of the cover body 149b.

The cover coupling member 149a may pass through the frame coupling hole 149d and then be coupled to the frame 110. The outer edge of the cover body 149b in which the frame coupling hole 149d is defined may further protrude or be expanded in a radial direction of the cover body 149b to form a bulge at the outer edge of the cover body 149b. This may prevent the cover coupling member 149a from interfering with the coil winding body 141c when the outer diameter of the outer stator 141 is expanded in outer diameter.

A protrusion 149f convexly protruding in an outward direction of the cover body 149b may be provided on a portion of the reinforcement sleeve 149c corresponding to the portion including the frame coupling hole 149d through a forming process. When the stator cover 149 is inserted into the shell 101, a processed surface 149g, which may be processed to be flat by a cutting or polishing process, may be formed on a portion of the outer circumferential surface of the protrusion 149f in order to prevent an inner circumferential surface of the shell 101 from being scratched due to interference between an outer circumferential surface of the protrusion 149f and the inner circumferential surface of the shell 101.

A plurality of rear cover coupling holes 149h may be defined between the frame coupling holes 149d adjacent to each other. A plurality of resonant spring seat parts (or resonant spring seats) 149i may protrude in a cone shape from the cover body 149b. The plurality of resonant spring seat parts 149i may be positioned at lateral sides of the frame coupling holes 149d. However, the arranged positions of the resonant spring seat parts 149i are not limited to the proposed embodiment.

Figure 7:
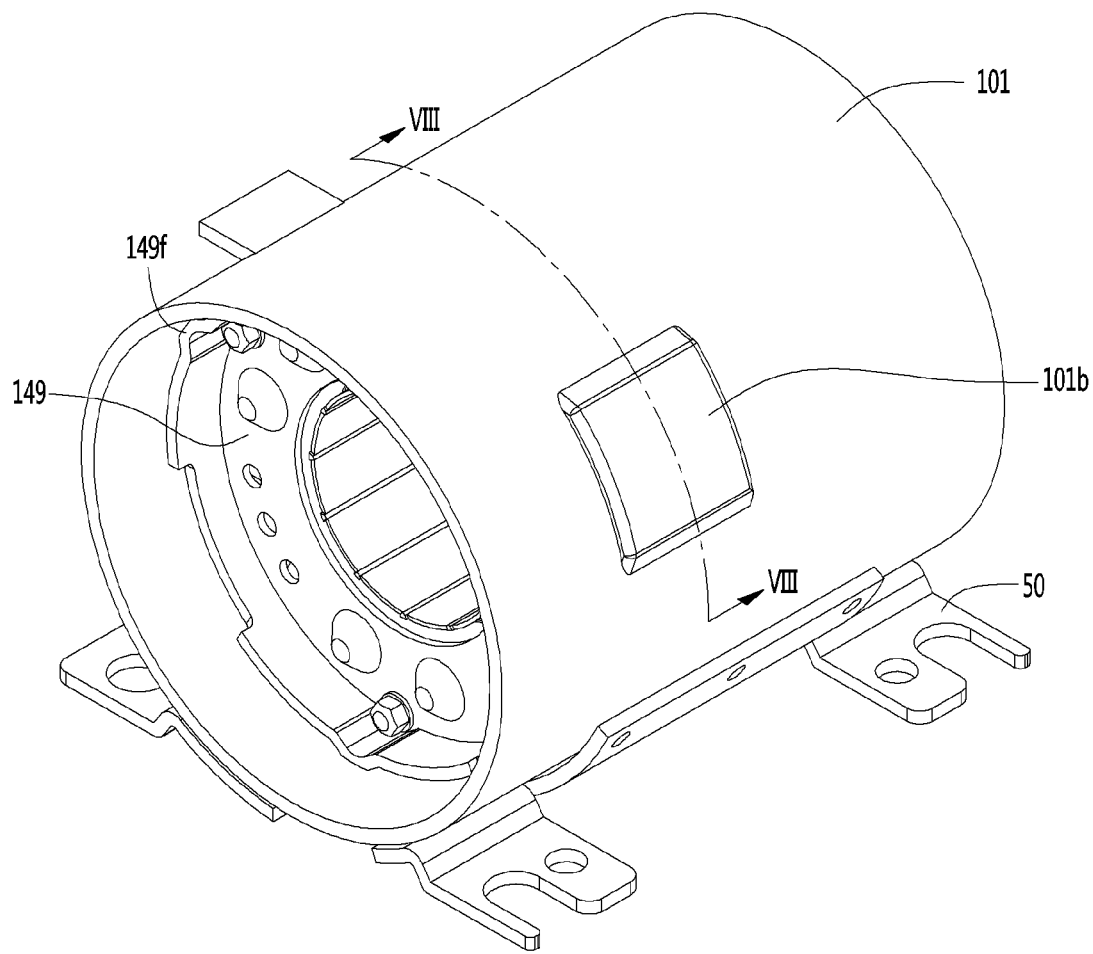
FIG. 7 is a perspective view of the compressor according to an embodiment, in a state in which the outer stator is mounted in the shell.
Figure 8:
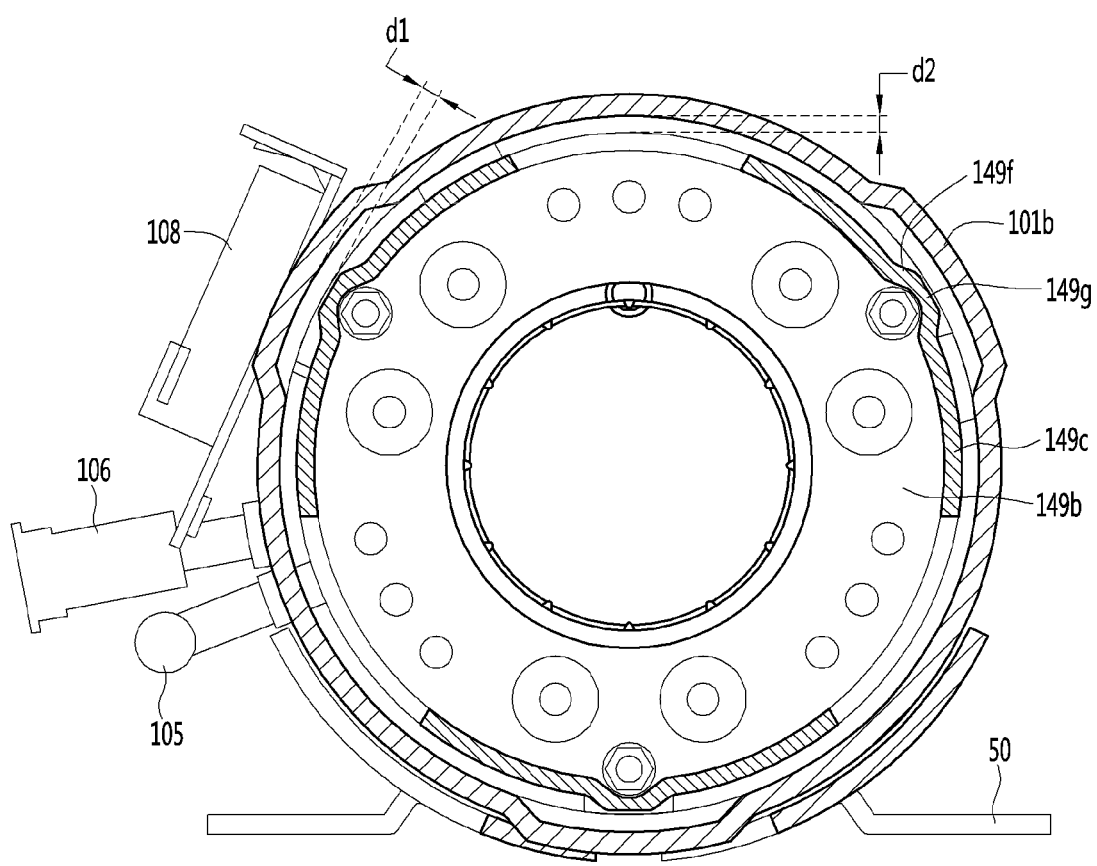
FIG. 8 is a longitudinal cross-sectional view of the compressor, taken along line VIII-VIII of FIG. 7.

FIG. 7 is a perspective view of the compressor according to an embodiment in a state in which the outer stator is mounted in the shell, and FIG. 8 is a longitudinal cross-sectional view of the compressor, taken along line VIII-VIII of FIG. 7. Referring to FIGS. 7 and 8, when the compressor body is mounted inside the shell 101, a forming part (or bulge) 101b may be formed at any point of the shell 101, which corresponds to a position of the protrusion 149f.

The forming part 101b may be recessed by a predetermined depth from the inner circumferential surface to the outer circumferential surface of the shell 101. The forming part 101b may also have a square or rectangular shape.

When the compressor body is mounted inside the shell 101, a distance d1 between the processed surface 149g of the protrusion 149f and an inner circumferential surface of the forming part 101b may be greater than a distance d2 between the outer edge of the stator cover 149 and the inner circumferential surface of the shell 101. That is, when the compressor body vibrates in the radial direction of the shell 101, although the stator cover 149 may come into contact with the inner circumferential surface of the shell 101, the processed surface 149g may not come into contact with the inner circumferential surface of the forming part 101b.

While the stator cover 149 is inserted into the shell 101, the processed surface 149g may be spaced apart from the inner circumferential surface of the shell 101 to prevent the protrusion 149f from scratching the inner circumferential surface of the shell 101. That is, a length from a center of the stator cover to the processed surface 149g may be less than the inner diameter of the shell 101.

When the shell 101 is placed on the installation surface, that is, when the central axis of the shell 101 is horizontal, the forming part 101b may be located at position which is spaced a predetermined distance (or a predetermined angle) from an upper end of the shell 101 in the circumferential direction of the shell 101. For example, as illustrated in the drawings, the three forming parts 101b may be arranged at the upper end of the shell 101 at positions spaced apart from the lower end of the shell 101 toward lateral sides in the circumferential direction. The two forming parts 101b spaced apart from the upper end of the shell 101 toward the lateral sides may be provided symmetrical to each other with respect to a center of the upper end of the shell 101.

The lower end of the shell 101 may be spaced apart from the installation surface of the shell 101 by the leg 50, and the forming part 101b arranged at the lower end of the shell 101 may also be spaced apart from the installation surface. The three forming parts 101b may be spaced a predetermined distance from each other at an angle of 120 degrees along the circumferential surface of the shell 101.

The linear compressor including the foregoing components according to embodiments may have at least following advantages. First, only a portion of the shell may protrude without changing the outer diameter of the shell of the compressor to increase in size of the motor. Also, as the motor increases a size, the compressor may increase in efficiency to improve power consumption.

Second, the convexly protruding portion may be arranged at a point which is spaced a predetermined angle from the uppermost surface of the shell, which is the reference point for measuring the height of the compressor, in the circumferential direction to prevent the compressor from increasing in size. Third, the protruding portion of the stator cover may be cut to form the processed surface, thereby preventing the inner circumferential surface of the shell from being damaged while the motor is mounted in the shell.

A linear compressor according to embodiments may include a shell having a cylindrical shape; a frame fixed inside the shell; a cylinder inserted to pass through the frame; a piston provided in the cylinder; a motor configured to allow the piston to linearly reciprocate; and a stator cover coupled to the motor. The stator cover may include a cover body; a reinforcement sleeve bent from an outer edge of the cover body; and a plurality of protrusions in which portions of the reinforcement sleeve protrude in a radial direction of the cover body. A portion of the shell corresponding to a position of each of the plurality of protrusions may include a bulge protruding in a radial direction of the shell.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A linear compressor, comprising:
   a shell having a cylindrical shape;
   a frame fixed inside the shell;
   a cylinder inserted to pass through the frame;
   a piston provided in the cylinder;
   a motor that linearly reciprocates the piston; and
   a stator cover coupled to the motor, wherein the stator cover includes:
      a cover body including a plurality of frame coupling holes which are defined along an outer edge of the cover body, spaced equidistant apart around the cover body in a circumferential direction of the cover body, and configured to allow cover coupling members to pass through the plurality of frame coupling holes and be coupled to the frame; and
      a reinforcement sleeve that extends from the outer edge of the cover body in an axial direction of the shell, the reinforcement sleeve extending away from the motor, wherein the reinforcement sleeve includes a plurality of protrusions that outwardly protrudes in a radial direction of the shell from the reinforcement sleeve at positions corresponding to the plurality of frame coupling holes, whereby, via the plurality of protrusions, the outer edge of the cover body in which the plurality of frame coupling holes is defined is expanded in the radial direction of the shell to prevent the cover coupling members from interfering with the motor, wherein portions of the shell corresponding to the positions of the plurality of protrusions include bulges that outwardly protrude in the radial direction of the shell and are recessed by a predetermined depth from an inner circumferential surface of the shell to an outer circumferential surface of the shell to prevent inner surfaces of the bulges from being scratched by the plurality of protrusions.

2. The linear compressor according to claim 1, wherein an outer circumferential surface of each of the plurality of protrusions includes a processed surface, and wherein a length from a center of the linear compressor to the processed surface is less than a length from the center of the linear compressor to an inner circumferential surface of the shell.

3. The linear compressor according to claim 2, wherein each processed surface is flat.

4. The linear compressor according to claim 2, wherein, when a central longitudinal axis of the shell is horizontally oriented, at least two bulges are arranged at points spaced a predetermined distance from an upper end of the shell in a circumferential direction of the shell.

5. The linear compressor according to claim 2, wherein a length from the processed surface of each of the plurality of protrusions to an inner circumferential surface of each of the bulges, respectively, is greater than a length from an outer circumferential surface of the reinforcement sleeve to the inner circumferential surface of the shell.

6. The linear compressor according to claim 2, wherein the bulges include three bulges, wherein one of the bulges is provided at a lower end of the shell and the other two of the bulges are provided at points spaced apart from an upper end of the shell toward left and right sides in a circumferential direction of the shell, and wherein the bulge provided at the lower end of the shell is spaced apart from an installation surface on which the shell is installed.

7. The linear compressor according to claim 1, further including the cover coupling members that pass through the plurality of frame coupling holes of the cover body and are inserted into the frame to allow the motor to be fixed to the frame.

8. The linear compressor according to claim 7, wherein the motor includes:
   an outer stator that surrounds the cylinder and having a first end attached to the frame;
   an inner stator provided inside the outer stator; and
   a permanent magnet arranged between the outer stator and the inner stator and connected to the piston, wherein the stator cover is attached to a second end of the outer stator.

9. The linear compressor according to claim 8, wherein the second end of the outer stator is attached to a first surface of the cover body.

10. The linear compressor according to claim 9, further including a plurality of resonant springs seated on a second surface of the cover body.

11. The linear compressor according to claim 10, wherein a plurality of resonant spring seats that supports the plurality of resonant springs protrudes from the cover body, and wherein the plurality of resonant spring seats is arranged at lateral sides of the plurality of frame coupling holes, respectively.

* * * * *